United States Patent [19]

Onishi

[11] Patent Number: 4,625,702
[45] Date of Patent: Dec. 2, 1986

[54] EXHAUST GAS RECIRCULATION CONTROL DEVICE FOR DIESEL ENGINE

[75] Inventor: Takanori Onishi, Toyota, Japan

[73] Assignee: Toyota Jidosha Kabushiki Kaisha, Japan

[21] Appl. No.: 726,777

[22] Filed: Apr. 24, 1985

[30] Foreign Application Priority Data

Sep. 11, 1984 [JP] Japan .............................. 59-188887

[51] Int. Cl.$^4$ ............................................ F02M 25/06
[52] U.S. Cl. .................................. 123/571; 364/431.06; 123/569
[58] Field of Search .............................. 123/569, 571; 364/431.04, 431.05, 431.06

[56] References Cited

U.S. PATENT DOCUMENTS

| | | | |
|---|---|---|---|
| 4,164,032 | 8/1979 | Nohira et al. | 364/431.06 |
| 4,450,825 | 5/1984 | Sekiguchi et al. | 123/569 |
| 4,453,379 | 6/1984 | Kawamura et al. | 123/569 X |
| 4,461,263 | 7/1984 | Hasegawa | 123/571 |
| 4,466,416 | 8/1984 | Kawamura | 123/569 X |
| 4,495,929 | 1/1985 | Maeda et al. | 123/569 |

FOREIGN PATENT DOCUMENTS 0151146 11/1980 Japan .
0151147 11/1980 Japan .

Primary Examiner—Willis R. Wolfe, Jr.
Attorney, Agent, or Firm—Parkhurst & Oliff

[57] ABSTRACT

The engine load signal, the engine speed signal, and the engine warm-up signal are directed to an electric control unit. The electric control unit issues an output signal depending on the engine condition; in the stage of engine warm-up, the output signal is issued from the first EGR MAP which does not permit EGR under idling of the engine and after full warm-up, it is issued from the second EGR MAP which permits EGR even under idling. Upon receiving the output signal, the electric vacuum regulating valve acts to adjust the opening degree of the EGR valve, thereby preventing the erosion and wear of the cylinder bore and the piston ring and reducing the generation of NOx.

8 Claims, 8 Drawing Figures

FIG. I

EXHAUST GAS RECIRCULATION CONTROL DEVICE FOR DIESEL ENGINE

BACKGROUND OF THE INVENTION

1. Field of the Invention

The present invention relates to an electrical exhaust gas recirculation (EGR) control device for the diesel engine.

2. Description of the Prior Art

Various proposals about EGR control for internal combustion engines, such as the diesel engine, have been made. One example is a disclosure by Japanese Patent Publication SHO 55-151147. This publication discloses a method for controlling the EGR volume in accordance with the engine temperature. A more elaborate EGR control considering the conditions of the engine revolution, load etc. has never been disclosed.

The diesel engine, in which an adiabatic high pressure combustion takes place, generates more various oxides of nitrogen (hereinafter referred to as NOx) under light load than the gasoline engine does; therefore the former needs more of EGR under light load than the latter. To reduce the generation of NOx, it is known that EGR under the condition of low engine revolution, such as idling or near-idling, is effective; and it is desirable that EGR is started at a low engine temperature.

However, if EGR is started under the condition of which the combustion temperature and the exhaust gas temperature are relatively low such as under the idling at the low engine temperature, difficulties are liable to occur such as an increased erosion and abrasion of the cylinder bore or the piston ring due to the condensed water containing the sulphur in the EGR gas. Other problems may include a deterioration of the oil, heavy wear of different parts, deterioration of startability, and a clogging of EGR passage, intake manifold and induction port due to the carbon in the EGR gas, all of which result in a serious drop in the engine durability, reliability and performance.

Thus for the purpose of reducing NOx, EGR must be started before the engine is fully warmed up and EGR must be done under idling (or near-idling), but EGR operation under idling or near-idling under which the combustion temperature and the exhaust gas temperature are low will invite the above-mentioned troubles.

SUMMARY OF THE INVENTION

An object of the present invention is to offer a system with less generation of NOx and free from the difficulties mentioned above. The system is designed such that under the condition of the low engine revolution such as idling or near-idling (hereinafter simply referred to as idling) at low combustion temperature and exhaust gas temperature, EGR starts after full warm-up of the engine, and under other conditions at high combustion temperature and exhaust gas temperature (hereinafter referred to as normal operation), EGR can start even before full warm-up of the engine.

To accomplish this object, the EGR control device for the diesel engine according to the present invention, includes an electric control unit in which an engine load sensor, an engine revolution sensor detecting an engine speed and a thermo-sensor detecting an engine warm-up state are connected, the electric control unit having a first EGR MAP which does not permit EGR under idling when an engine is being warmed up and a second EGR MAP which permits EGR even under idling after the engine has been fully warmed up, THE two EGR MAPs being connected via an OR circuit; and an electric vacuum regulating valve connected to THE electric control unit and serving to regulate the opening degree of an EGR valve upon receiving an output signal from the electric control unit.

The MAP is a memory put in the electric control unit and defines an operating area and an unoperating area of EGR with respect to the relationship between the engine speed and an engine load.

The first EGR MAP may include MAP.A which issues an output signal for EGR at the stage of fuel injection and at an engine speed over the engine speed $N_1$ higher than the idling speed, and the second EGR MAP may include MAP.B which issues an output signal for EGR at the stage of fuel injection and at an engine speed over the engine speed $N_2$ lower than the idling speed.

Alteratively, the first EGR MAP may include MAP.A which issues an output signal for EGR in the stage of fuel injection and at an engine speed over the engine speed $N_1$ higher than the idling speed and the second EGR MAP may include MAP.C which issues an output signal for EGR in the stage of fuel injection and only at the revolution between the engine speed $N_2$ lower than the idling speed and the engine speed $N_1$ higher than the idling speed.

When the working current in the electric vacuum regulating valve is increased, the output of the electric vacuum regulating valve becomes a high negative pressure, which increases the opening degree of the EGR valve.

In the thus constituted EGR control device for the diesel engine, as the first EGR MAP and the second EGR MAP are connected via the OR circuit, the first EGR MAP acts selectively when the combustion temperature and the exhaust gas temperature are low and the engine is in the idling state, and thereby EGR does not start. In this way, various difficulties are avoided, such as erosion OR abrasion of the cylinder bore and the piston ring; degradation of the oil (lubricant) with carbon, soot formation and consequent increase of wear of movable elements and deterioration of startability; or generation of smoke due to poor combustion.

When the combustion temperature and the exhaust gas temperature are sufficiently high, the second EGR MAP selectively acts starting EGR even under idling and thereby efficiently reducing NOx.

BRIEF DESCRIPTION OF THE DRAWINGS

The above objects, features and advantages of the present invention will become apparent and more readily appreciated from the following detailed description of exemplary embodiments of the present invention, taken in conjunction with the accompanying drawings, wherein.

DETAILED DESCRIPTION OF THE PREFERRED EMBODIMENTS

FIGS. 1 to 6 illustrate one embodiment of the present invention.

Figure 1:
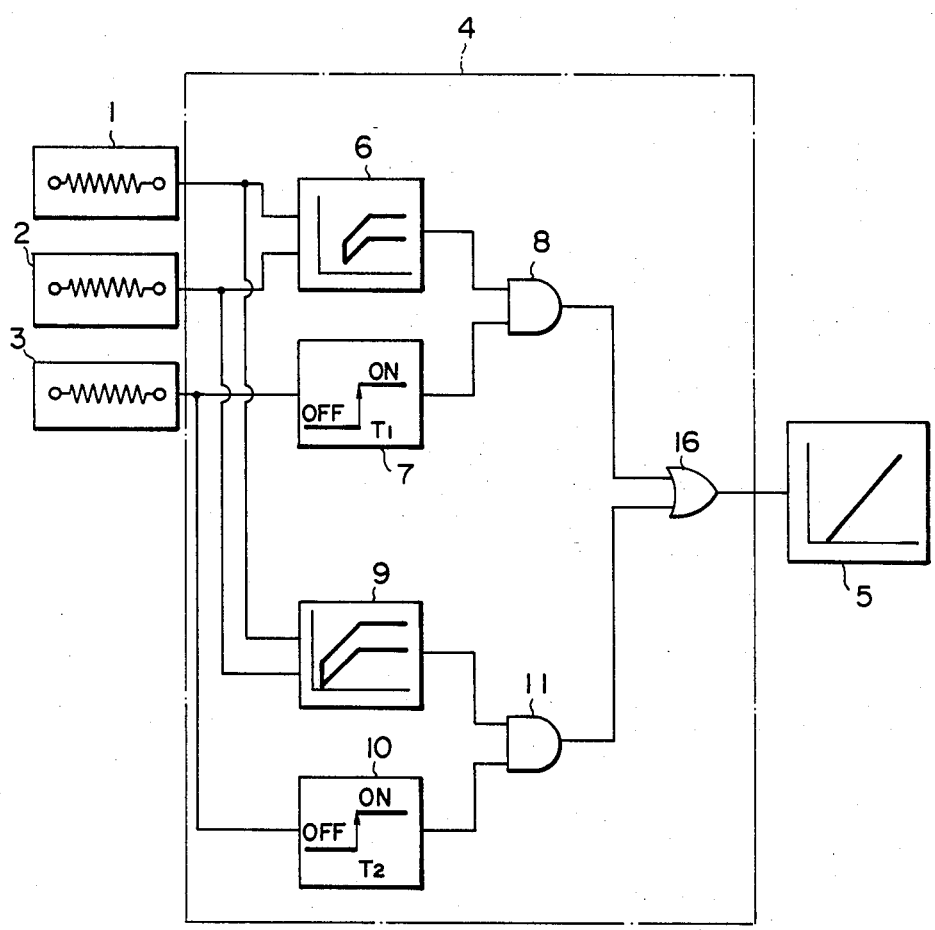
FIG. 1 is a block diagram of a diesel engine EGR control device in accordance with an embodiment of the present invention.

In FIG. 1 showing a control system in accordance with one embodiment, the engine load sensor 1 (in the illustrated example, this is a sensor of the opening degree of the adjusting lever to detect the opening degree of the adjusting lever for the injection pump), the engine speed sensor 2 for detecting the number of engine revolutions, and the thermo-sensor 3 for detecting the engine warm-up by, say, detecting the temperature of the engine cooling water, are connected to the input terminal of the electric control unit 4 (hereinafter abbreviated as ECU). The output terminal of ECU 4 is connected to the electric vacuum regulating valve 5 (hereinafter referred to as EVRV).

ECU 4 includes MAP.A 6 which acts on an input of the signals from the adjusting lever opening degree sensor 1 and from the engine speed sensor 2; an ON-OFF means 7 which acts on an input of the signal from the thermo-sensor 3, issuing an ON signal at over a specified temperature $T_1$ in the warm-up process and issuing an OFF signal at below said specified temperature $T_1$; and an AND circuit 8 to which the output sides of MAP.A 6 and the ON-OFF means 7 are connected. The output side of the AND circuit 8 is connected via the OR circuit 16 to EVRV 5. Meanwhile, ECU 4 also includes MAP.B 9 which acts on an input of the signals from the adjusting lever opening degree sensor 1 and from the engine speed sensor 2; an ON-OFF means 10 which acts on an input of the signal from the thermo-sensor 3, issuing an ON signal at over the temperature $T_2$ after full warm-up of the engine and issuing an OFF signal at below said temperature $T_2$; and an AND circuit 11 to which the output sides of MAP.B 9 and the ON-OFF means 10 are connected. The output side of the AND circuit 11 is connected via the OR circuit 16 to EVRV 5.

Figure 2:
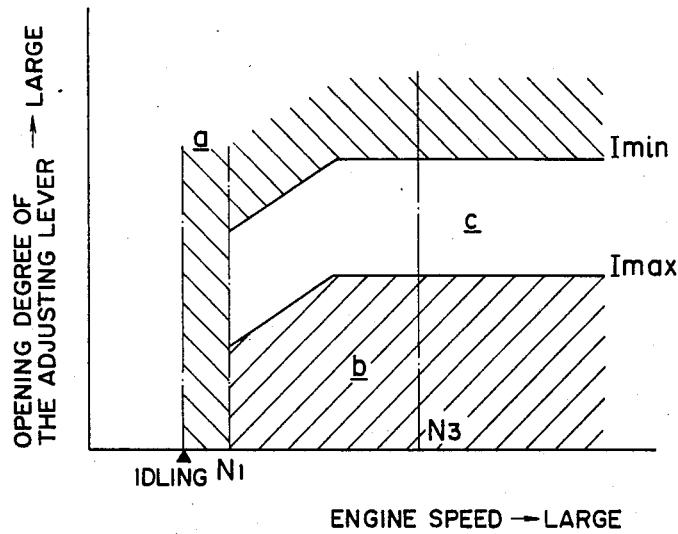
FIG. 2 is a diagram showing the control action of MAP.A in the device of FIG. 1.

MAP.A 6 is so designed to exhibit the characteristics illustrated in FIG. 2. Thus MAP.A 6 issues an output signal in the fuel injection stage (corresponding to the opening degree of the adjusting lever) where the combustion temperature and the EGR gas temperature are raised and at an engine speed over a predetermined engine speed $N_1$ higher than the idling speed.

In FIG. 2, a is the EGR cut area; b is the EGR valve full open area; and c is the area in which upon a signal from ECU 4, EGR starts at the minimum value I min of the EVRV working current and the EGR valve fully opens at the maximum value I max. At a value between these two values, the EGR valve lift changes linearly. The EGR valve lift means a opening degree of the EGR valve, and the EGR valve lift corresponds to the EGR volume.

MAP. B9 is designed to exhibit the characteristics illustrated in FIG. 3. Thus MAP.B 9 issues an output signal for EGR in the fuel injection stage (corresponding to the opening degree of the adjusting lever) where the combustion temperature and the EGR gas temperature are raised and at an engine speed greater than a predetermined engine speed $N_2$ lower than the idling speed.

Figure 3:
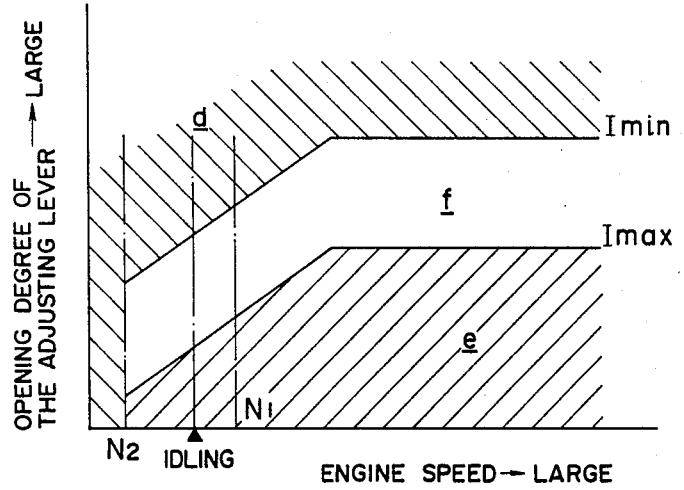
FIG. 3 is a diagram showing the control action of MAP.B in the device of FIG. 1.

In FIG. 3, d is the EGR cut area; e is the EGR valve full open area; and f is the area in which upon a signal from ECU 4, EGR starts at the minimum value I min of the EVRV 5 working current and the EGR valve fully opens at the maximum value I max. At a value between these two values, the EGR valve lift changes linearly.

Figure 6:
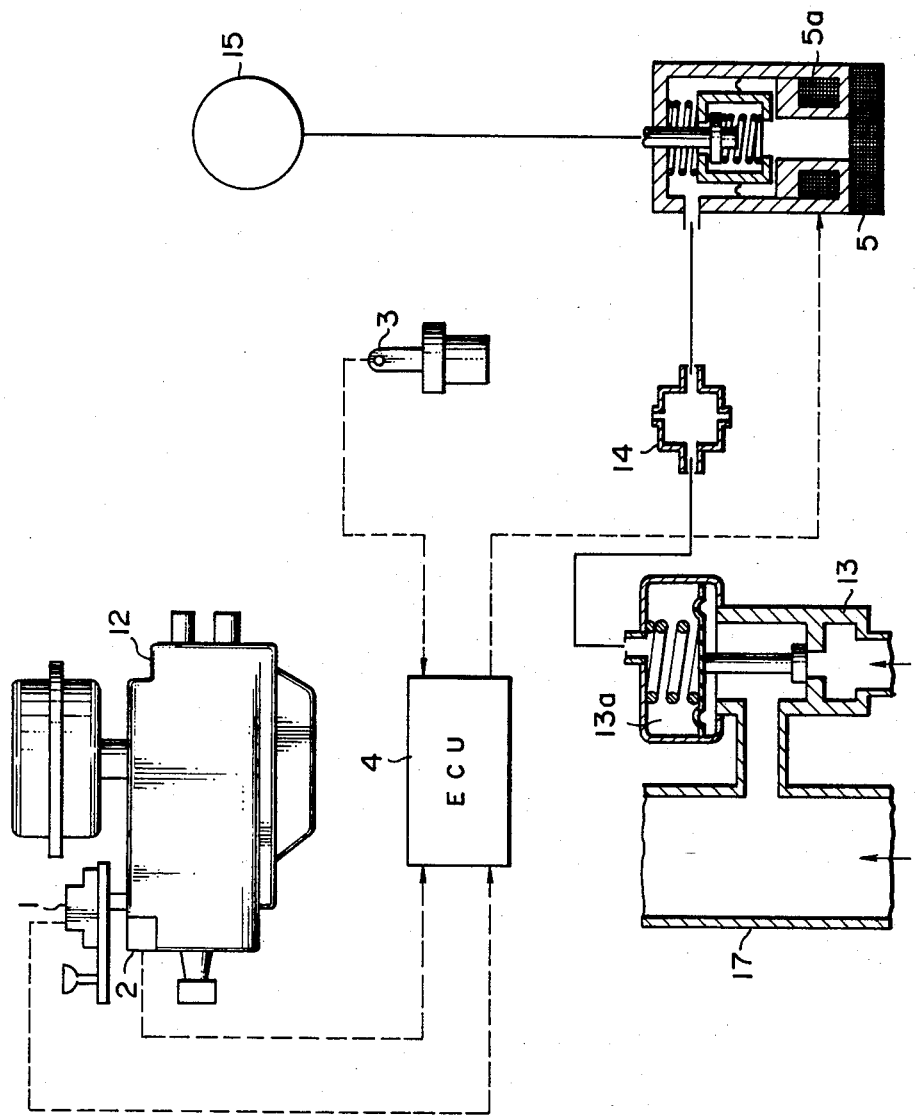
FIG. 6 is a block diagram of the control system applying the device of FIG. 1 for EGR control of a diesel engine.

FIG. 6 is a block diagram illustrating an application of the above device to a diesel engine.

In FIG. 6, the injection pump 12 for the diesel engine includes an adjusting lever opening degree sensor 1 and an engine speed sensor 2. The adjusting lever opening degree sensor 1, the engine speed sensor 2 and the thermo-sensor 3 are connected to ECU 4. The EGR valve 13 is installed in the EGR passage extending from the engine exhaust system to the intake manifold 17, while the negative pressure chamber 13a of the EGR valve 13 is connected via the vacuum damper 14 to EVRV 5, which in turn is connected to the vacuum pump 15 to be driven by an alternator. The negative pressure of the vacuum pump 15 is controlled by EVRV 5 and then supplied via the vacuum damper 14 to the negative pressure chamber 13a. EVRV 5 has the characteristics illustrated in FIG. 4. Thus, when the working current flowing in the magnet 5a of EVRV 5 increases, the negative pressure from EVRV 5 rises, generating a high negative pressure and thereby enlarging the opening of the EGR valve 13.

In the device described above in accordance with this embodiment, the EGR volume is controlled in the following manner.

Figure 4:
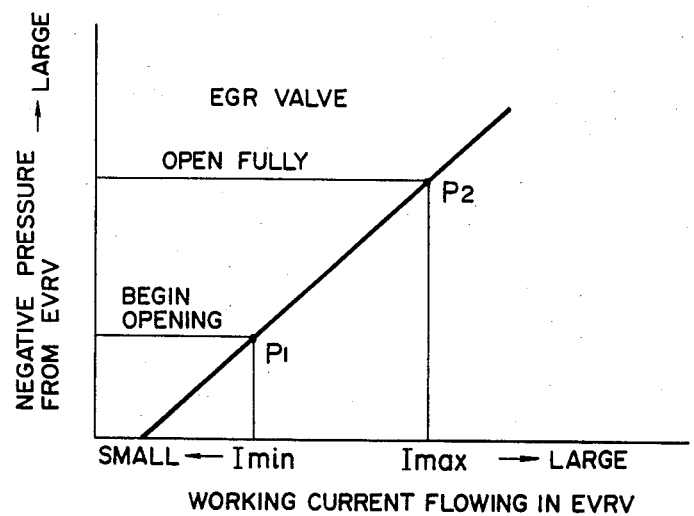
FIG. 4 is a diagram illustrating the relation among the working current and output pressure of EVRV (electric vacuum regulating valve) and the EGR valve opening in the device of FIG. 1.

ECU 4 receives an input of the signals from the adjusting lever opening degree sensor 1 of the injection pump and from the engine speed sensor 2. Thereupon the ECU 4 delivers outputs from MAP.A 6 and MAP.B 9 to the respective AND circuits 8 and 11. When the thermo-sensor 3 which acts when detecting engine warm-up (for instance, from the temperature of the engine cooling water) issues an ON signal upon a specified temperature $T_1$ being reached in the warm-up process, the output of MAP.A 6 goes via the AND circuit 8 to EVRV 5; thus EGR is controlled by MAP.A 6. MAP.A 6 acts to start EGR, in the area where the combustion temperature and the EGR gas temperature rise and where the engine speed $N_1$ is higher than the idling speed. Upon receiving an output (power) from ECU 4, EVRV 5 delivers a negative pressure of the vacuum pump 15 to the EGR valve 13, as indicated in FIG. 4. A negative pressure $P_1$ delivered from EVRV 5 at minimum value I min of the working current flowing in EVRV 5 causes the EGR valve 13 to begin opening, and a negative pressure $P_2$ delivered from EVRV 5 at maximum value I max of said current causes the EGR valve 13 to open fully.

Figure 5:
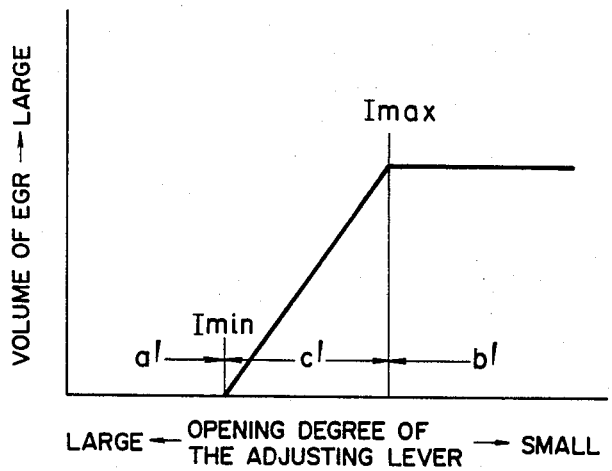
FIG. 5 is a diagram illustrating the relation between the opening degree of the adjusting lever and the volume of EGR in the device of FIG. 1.

FIG. 5 illustrates the relation between the adjusting lever opening degree at a specific value $N_3$ of the engine revolution higher than the value $N_1$ in MAP.A 6 and the volume of EGR. As illustrated, the volume of EGR is thus greater under light load. Under this light load the troubles mentioned above do not develop with no EGR at idling.

The areas a', b' and c' in FIG. 5 correspond to the areas a, b and c in FIG. 2.

Next, when the thermo-sensor 3 detects the full warm-up temperature $T_2$ of the engine and issues an ON signal, MAP.B 9 acts on EVRV 5 via the AND circuit 11. Thus EGR is controlled by MAP.B 9. MAP.B 9 starts EGR at over the engine speed $N_2$ lower than the idling speed, as indicated in FIG. 3. After full warm-up, the combustion temperature and the EGR gas temperature are high enough and therefore the above-mentioned troubles will not happen even if EGR is started under idling.

Figure 7:
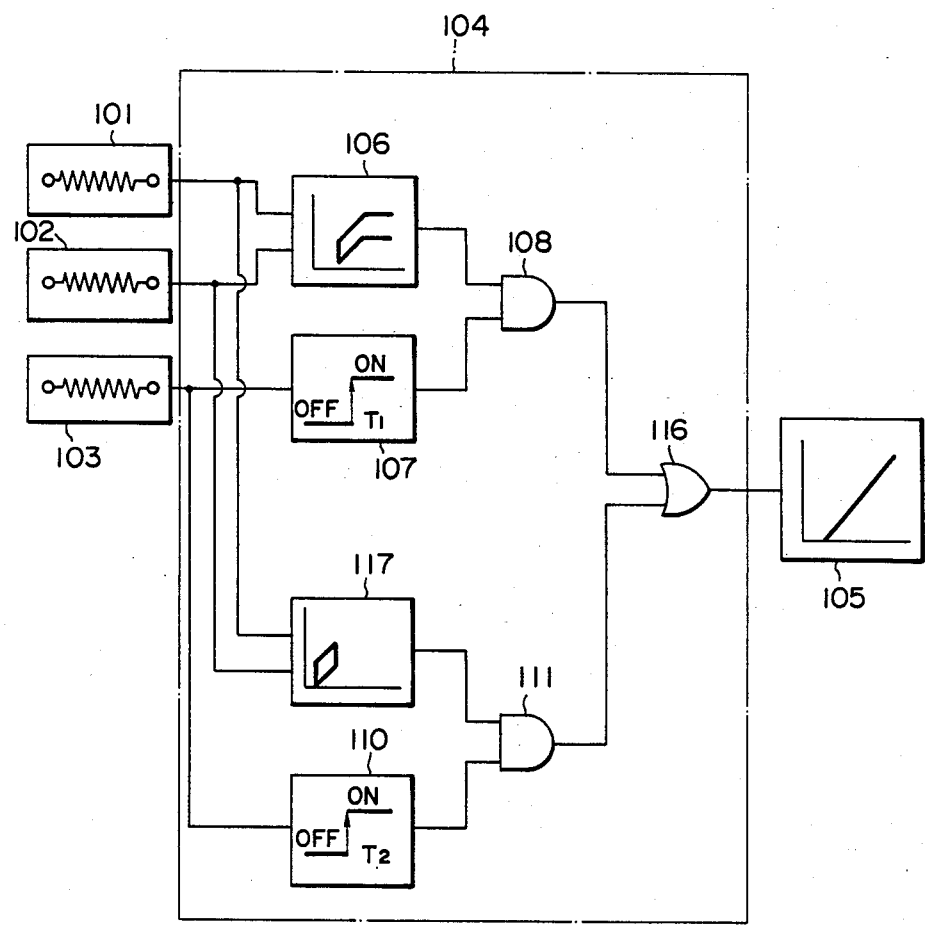
FIG. 7 is a block diagram of a diesel engine EGR control device in accordance with another embodiment of the present invention.
Figure 8:
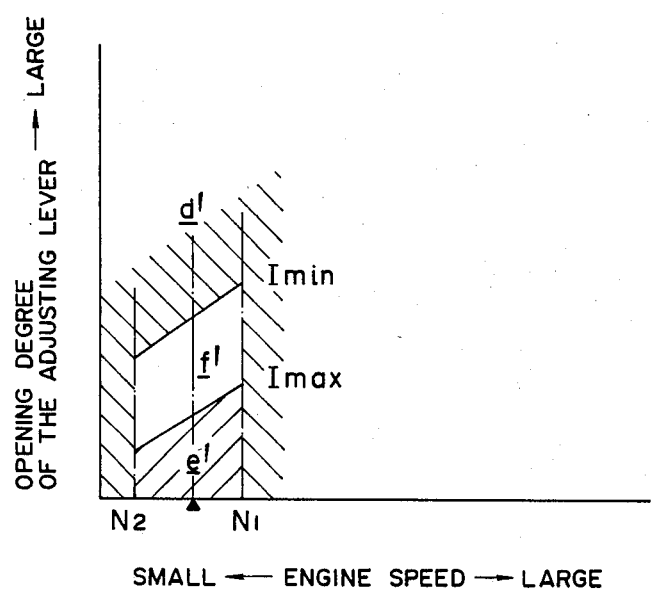
FIG. 8 is a diagram showing the control action of MAP. C in the device of FIG. 7.

FIGS. 7 and 8 illustrate another embodiment of the present invention. In this embodiment, MAP.C 117 which corresponds to MAP.B 9 in the previous embodiment has its characteristics changed as indicated in FIG. 8. MAP.C 117 has such characteristics that it issues an output signal for EGR only when the engine revolution is a value between the speed $N_2$ lower than the idling speed and the speed $N_1$ higher than the idling speed. In FIG. 8, d' is the EGR cut area; e' is the EGR valve full open area; and f' is the area in which upon receiving an output signal from ECU 104, EGR starts at the minimum value I min of the working current flowing in EVRV 105 and EGR becomes fully open at the maximum value I max of said current. At a value between these two extreme values of the current, EGR valve lift changes linearly.

As for the other components, namely the adjusting lever opening degree sensor 101, the engine speed sensor 102, the thermo-sensor 103, ECU 104, EVRV 105, MAP.A 106, ON-OFF means 107, ON-OFF means 110, the AND circuit 108, the AND circuit 111 and the OR circuit 116, this embodiment is similar to the previous embodiment.

In this embodiment, the volume of EGR is controlled as follows. The EGR action after the temperature $T_1$ is attained in the course of engine warm-up is the same as in the previous embodiment. At over the temperature $T_2$ after full warm-up, MAP.C 117 acts via the AND circuit 111, but on account of the OR circuit 116, a resultant output of MAP.A 106 and MAP.C 117 is yielded and therefore EGR is controlled by the same MAP as the above-mentioned MAP.B 9. At over $T_2$, EGR is done even under idling. Thus the effect of this embodiment is similar to that of the previous embodiment.

In both embodiments, it may be designed such that MAP.A 6 and MAP.A 106 act for a small volume of EGR, while MAP.B 9 and MAP.C 117 act for a large volume of EGR. It goes without saying that MAP.A 6, MAP.A 106, MAP.B 9 and MAP.C 117 can be set to conform to the engine requirements.

Thus when the diesel engine EGR is done according to the present invention, EGR is possible at low combustion temperature and low exhaust gas temperature without any difficulties mentioned above. To be specific, the following difficulties can be avoided according to the present invention;

(A) erosion and abrasion of cylinder bore and piston ring;

(B) degradation of oil due to carbon and soot generated, consequent wear of movable elements (cylinder bore, piston ring, camshaft, valve etc.) and getting worse of the startability, clogging of EGR passage and increased generation of NOx; and (C) increased generation of smoke (graphite, white smoke).

Although only preferred embodiments of the present invention have been described in detail, it will be appreciated by those skilled in the art that various modifications and alterations can be made to the particular embodiments shown without materially departing from the novel teachings and advantages of the invention. Accordingly, it is to be understood that all such modifications and alterations are included within the scope of the invention as defined by the following claims.

What is claimed is:

1. An EGR control device for controlling an EGR valve in a diesel engine, said EGR control device comprising:

an electric control unit means for receiving input from an engine load sensor means for detecting engine load, an engine revolution sensor means for detecting an engine speed and a thermo-sensor means for detecting an engine temperature state, said electric control unit means having a first EGR MAP for preventing EGR under a low engine revolution idling speed during low engine temperature states, a second EGR MAP for permitting EGR under the low engine revolution idling speed during high engine temperature states, and a means for selecting either said first EGR MAP or said second EGR MAP in accordance with engine operating conditions, wherein said first EGR MAP issues an output signal for EGR in a stage of fuel injection and an engine speed greater than a first predetermined engine speed that is higher than the idling speed and said second EGR MAP issues an output signal for EGR in the stage of fuel injection and at an engine speed greater than a second predetermined engine speed that is lower than the idling speed; and an electric vacuum regulating valve means connected to said electric control unit means and receiving an output signal therefrom, said electric vacuum regulating valve means regulating an opening degree of said EGR valve in accordance with said output signal from said electric control unit.

2. The EGR control device for the diesel engine of claim 1, wherein said first EGR MAP issues an output signal of EGR in the stage of fuel injection and at an engine speed greater than a first predetermined engine speed that is higher than the idling speed; and said second EGR MAP issues an output signal for EGR in the stage of fuel injection and at an engine revolution speed between a second predetermined engine speed lower than the idling speed and said first engine speed higher than the idling speed.

3. The EGR control device for the diesel engine of claim 1, wherein said engine load sensor means is an adjusting lever opening degree sensor for detecting an opening degree of an adjusting lever in a fuel injection pump for the diesel engine.

4. The EGR control device for the diesel engine of claim 1, wherein, when a working current of said electric vacuum regulating valve means is increased, an output from said electric vacuum regulating valve means produces a high negative pressure, thereby increasing the opening degree of said EGR valve.

5. The EGR control device for the diesel engine of claim 1, wherein said EGR valve is located in an EGR passage extending from an engine exhaust system to an intake manifold and said EGR valve opens the EGR passage when a negative pressure is introduced.

6. The EGR control device for the diesel engine of claim 1, wherein said electric vacuum regulating valve means is connected to a vacuum pump for the diesel engine.

7. The EGR control device for the diesel engine of claim 1, wherein said electric vacuum regulating valve means is connected via a vacuum damper to said EGR valve.

8. The EGR control device for the diesel engine of claim 1, wherein said selecting means is an OR circuit which is connected to said first EGR MAP and said second EGR MAP.

* * * * *